United States Patent
Fujiwara et al.

(10) Patent No.: US 11,525,469 B2
(45) Date of Patent: Dec. 13, 2022

(54) JUNCTION STRUCTURE

(71) Applicant: Panasonic Intellectual Property Management Co., Ltd., Osaka (JP)

(72) Inventors: Junji Fujiwara, Osaka (JP); Atsuhiro Kawamoto, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 1002 days.

(21) Appl. No.: 16/318,422

(22) PCT Filed: Aug. 3, 2017

(86) PCT No.: PCT/JP2017/028249
§ 371 (c)(1),
(2) Date: Jan. 17, 2019

(87) PCT Pub. No.: WO2018/030272
PCT Pub. Date: Feb. 15, 2018

(65) Prior Publication Data
US 2019/0257333 A1    Aug. 22, 2019

(30) Foreign Application Priority Data

Aug. 9, 2016   (JP) .............................. JP2016-156194

(51) Int. Cl.
*B23K 9/00* (2006.01)
*B23K 9/23* (2006.01)
(Continued)

(52) U.S. Cl.
CPC ................ *F16B 5/08* (2013.01); *B23K 9/007* (2013.01); *B23K 9/23* (2013.01); *B23K 33/00* (2013.01)

(58) Field of Classification Search
CPC . B23K 9/00; B23K 9/007; B23K 9/09; B23K 9/0026–0043; B23K 9/23; B23K 33/00–008
See application file for complete search history.

(56) References Cited

U.S. PATENT DOCUMENTS

| | | | |
|---|---|---|---|
| 1,346,054 A * | 7/1920 | Pennington | .......... B23K 9/0026 411/504 |
| 10,364,834 B2 * | 7/2019 | Izuhara | .................. B23K 11/20 |

(Continued)

FOREIGN PATENT DOCUMENTS

| | | |
|---|---|---|
| CN | 102049591 | 5/2011 |
| CN | 102059460 | 5/2011 |

(Continued)

OTHER PUBLICATIONS

Examination Report dated Mar. 4, 2021 in corresponding Indian Patent Application No. 201947003337.

(Continued)

*Primary Examiner* — Michael A Laflame, Jr.
(74) *Attorney, Agent, or Firm* — Wenderoth, Lind & Ponack, L.L.P.

(57) ABSTRACT

A junction structure includes a first metallic material, a second material different in type from the first metallic material, and a welding wire as a third material similar to the first metallic material. The second material is stacked on the first material. The molten metal of the third metallic material is deposited by arc welding into the through part of the second material so as to form a flanged or tapered bead, so that the first and third metallic materials and the second material are fixed together.

12 Claims, 13 Drawing Sheets

(51) Int. Cl.
  *B23K 33/00* (2006.01)
  *F16B 5/08* (2006.01)
  *B23K 9/007* (2006.01)

(56) References Cited

U.S. PATENT DOCUMENTS

| | | | |
|---|---|---|---|
| 10,981,246 B2 * | 4/2021 | Kawamoto | B23K 26/21 |
| 2016/0123362 A1 | 5/2016 | Iwase | |
| 2019/0047067 A1 * | 2/2019 | Ryu | B23K 9/007 |
| 2020/0147671 A1 * | 5/2020 | Iwase | B23K 9/0026 |

FOREIGN PATENT DOCUMENTS

| | | |
|---|---|---|
| CN | 102126064 | 7/2011 |
| DE | 199 13 436 | 12/2000 |
| DE | 102010044886 | 5/2011 |
| JP | 52-114446 | 9/1977 |
| JP | 58-110175 | 6/1983 |
| JP | 60-166177 | 8/1985 |
| JP | 10-272580 | 10/1998 |
| JP | 2000-153045 | 6/2000 |
| JP | 2006-130541 | 5/2006 |
| JP | 2015-042417 | 3/2015 |

OTHER PUBLICATIONS

Extended European Search Report dated Jul. 24, 2019 related European Patent Application No. 17839343.5.
International Search Report of PCT application No. PCT/JP2017/028249 dated Oct. 24, 2017.
Communication pursuant to Article 94(3) EPC dated Oct. 18, 2021 issued in corresponding European Patent Application No. 17839343.5.

* cited by examiner

JUNCTION STRUCTURE

CROSS-REFERENCE TO RELATED APPLICATIONS

This application is a U.S. national stage application of the PCT International Application No. PCT/JP2017/028249 filed on Aug. 3, 2017, which claims the benefit of foreign priority of Japanese patent application No. 2016-156194 filed on Aug. 9, 2016, the contents all of which are incorporated herein by reference.

TECHNICAL FIELD

The present disclosure relates to a junction structure including a metallic material and at least one material different in type from the metallic material. These materials are fixed to each other using arc or plasma as a heat source.

BACKGROUND ART

The recent globalization of the production of automobiles and other transportation vehicles has created a growing demand for reducing the total cost for each vehicle, in particular, for improving throughput by reducing production time.

Furthermore, there is a global demand for reducing $CO_2$ emissions to prevent global warming, and this demand has been answered by the transportation vehicle industry, which is making increasing efforts to improve fuel efficiency. One of the efforts is to reduce the vehicle weights by, for example, increasing the proportion of light-weight materials in the vehicles.

With such a background, spot welding is popular in this industry. However, this welding is a kind of resistance welding, in which materials to be welded are pressurized by upper and lower electrodes until there is no gap left between the materials, and then the electrodes are energized. For this reason, spot welding is not suitable for one side welding. Spot welding also imposes limitations on the product shape because the part to be welded is sandwiched from above and below. Another disadvantage of the welding is that pressurizing the part to be welded needs a space into which the welding gun with the upper and lower electrodes enters above and below the materials to be welded. Still another disadvantage is that beside welding time, spot welding takes additional time, such as the time to carry the heavy gun, the time to pressurize the materials after the gun reaches the part to be welded, and the time to cool the welded part.

Meanwhile, the industry is trying to reduce the weight of automobile materials by changing some of the materials from steel to light metal such as aluminum. This trend has created a growing demand for techniques and structures that allow the joining of light metal and steel.

Examples of conventional tools for joining different types of materials together include rivets for spot welding, and adhesives. Patent Literature 1 discloses the following techniques: a pressurization method in which a rivet and a material of the same type as the rivet sandwich a different type of material and pressurize it; a rivet having a shape capable of absorbing the plastic flow of the different type of material caused by welding heat input; and methods of crimping and spot welding capable of the absorption. This configuration ensures the space into which deformed part of the different type of material is moved during the crimping and spot welding. The configuration also prevents depression of the different type of material due, for example, to misalignment of the electrodes during spot welding, thereby maintaining the junction strength.

CITATION LIST

Patent Literature

PTL 1: Japanese Unexamined Patent Application Publication No. 2015-42417

SUMMARY

Technical Problem

In conventional junction members including a material that is different in type from the remaining materials, crimping and spot welding use a space to accommodate the deformed part of the different type of material. In addition, electrodes are to be prevented from being misaligned during spot welding so as to prevent depression of the different type of material, thereby maintaining the junction strength between the junction members. These conditions can be satisfied by using rivets with a complicated shape, such as a radius-chamfered part or an annular groove. Rivets with such a complicated shape can be fabricated by high precision processing technology, thus increasing the production cost. Furthermore, resistance spot welding involves time-consuming steps such as pressurization, energization, cooling, and transfer. Moreover, a set of junction members is sandwiched from both sides, which indicates a low degree of design freedom. Furthermore, adjacent rivets too close to each other can cause current diversion during spot welding. This would result in insufficient formation of a nugget, which is a part welded and solidified in the resistance welding. A desired nugget without current diversion can be formed by setting the pitch between adjacent rivets at not less than the minimum pitch. Therefore, rivets should be arranged at a pitch not less than the minimum pitch, making it impossible to improve junction stiffness at required positions.

The present disclosure provides a simple junction structure in which different types of materials are junctioned together easily by arc or plasma welding so as to improve the throughput.

Solution to Problem

To overcome the above problems, the junction structure according to the present disclosure includes: a first metallic material; at least one type of different material having a through part, the different material being different in type from the first metallic material, being difficult to be welded to the first metallic material, being stacked on the first metallic material; and a molten welding wire bonded to the first metallic material by arc welding through the through part along the thickness of the first metallic material, the molten welding wire being deposited into the through part of the different material, the molten welding wire being deposited onto a region which is on the upper surface of the different material and surrounds the through part, so that the different material and the first metallic material are fixed together.

In the above-described junction structure of the present disclosure, the different material may have a recess containing the through part to be joined to the first metallic material, and the different material may be stacked on the first metallic material with the recess facing up and be fixed to the first metallic material.

In the above-described junction structure of the present disclosure, the first metallic material may have a protruding junction, the different material may have a recess larger than the protruding junction of the first metallic material, and the protruding junction of the first metallic material and the recess of the different material may be engaged with each other.

Another junction structure according to the present disclosure may include: a first metallic material; at least one type of different material having a through part, the different material being different in type from the first metallic material, being difficult to be welded to the first metallic material, being stacked on the first metallic material; and a molten welding wire bonded to the first metallic material by arc welding through the through part along thickness of the first metallic material, the molten welding wire being deposited into the through part of the different material, the molten welding wire being deposited onto a region which is on the upper surface of the different material and surrounds the through part. The different material and the first metallic material may be fixed together by a welding process including a plurality of steps each having a different welding method and a different welding condition such that the molten welding wire is fixed to the region surrounding the through part.

In the above-described junction structure of the present disclosure, the plurality of steps may comprise: a first step of depositing the molten welding wire into the through part of the different material; and a second step of depositing the molten welding wire onto the region which is on the upper surface of the different material and surrounds the through part.

In the above-described junction structure of the present disclosure, the switching between a first step of depositing the molten welding wire into the through part of the different material and a second step of depositing the molten welding wire onto the region which is on the upper surface of the different material and surrounds the through part can be performed either by: while an arc is maintained, or after the arc is turned off and then turned on again.

In the above-described junction structure of the present disclosure, the molten welding wire weldable to the first metallic material may be deposited onto the region on the upper surface of the different material during arc welding, so that a direct heat input can melt the region on the upper surface of the different material, allowing the molten welding wire to be firmly fixed on the region on the upper surface of the different material.

In the above-described junction structure of the present disclosure, the arc welding may be one of the following: arc welding with a consumable electrode, tungsten inert gas welding with a non-consumable electrode, and plasma welding with a non-consumable electrode.

Still another junction structure according to the present disclosure may include: a first metallic material; at least one type of different material having a tapered through part, the different material being different in type from the first metallic material, being difficult to be welded to the first metallic material, being stacked on the first metallic material; and a molten welding wire bonded to the first metallic material by arc welding through the through part along thickness of the first metallic material, the molten welding wire being deposited into the through part of the different material so as to form a flanged or tapered bead, so that the different material and the first metallic material are fixed together.

Advantageous Effects of Invention

The junction structure of the present disclosure achieves highly reliable joining of different types of materials. This structure can not only greatly reduce production cycle time but also increase stiffness at required positions, thereby increasing the degree of design freedom of junction members.

DESCRIPTION OF EMBODIMENTS

First Exemplary Embodiment

Figure 1:
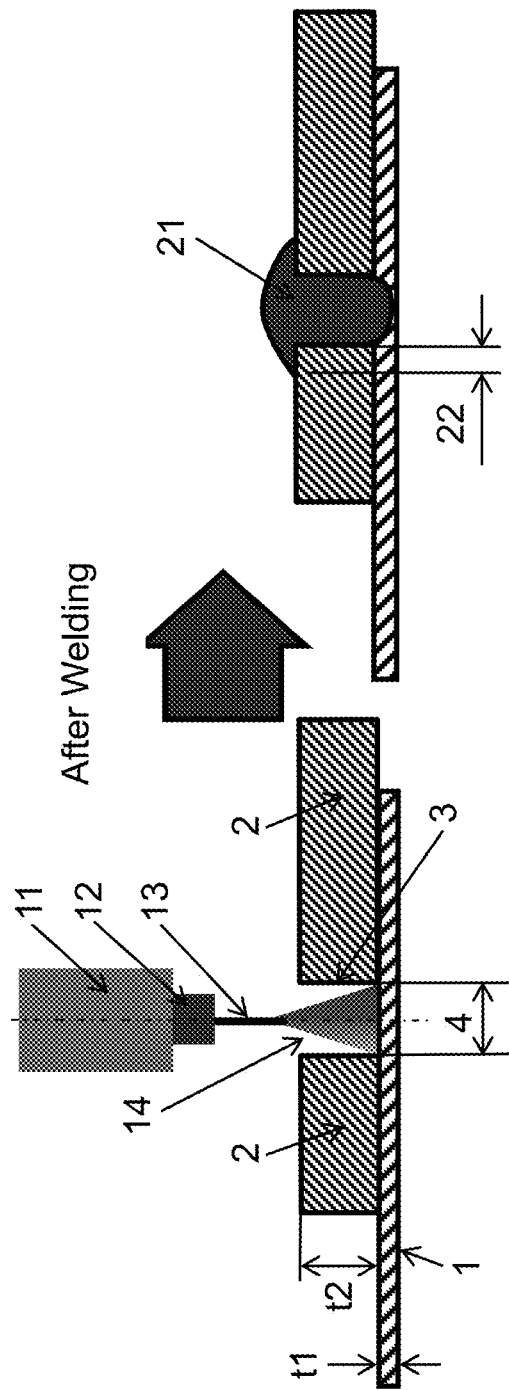
FIG. 1 is a schematic diagram of a junction structure during arc welding according to a first exemplary embodiment of the present disclosure.
Figure 11:
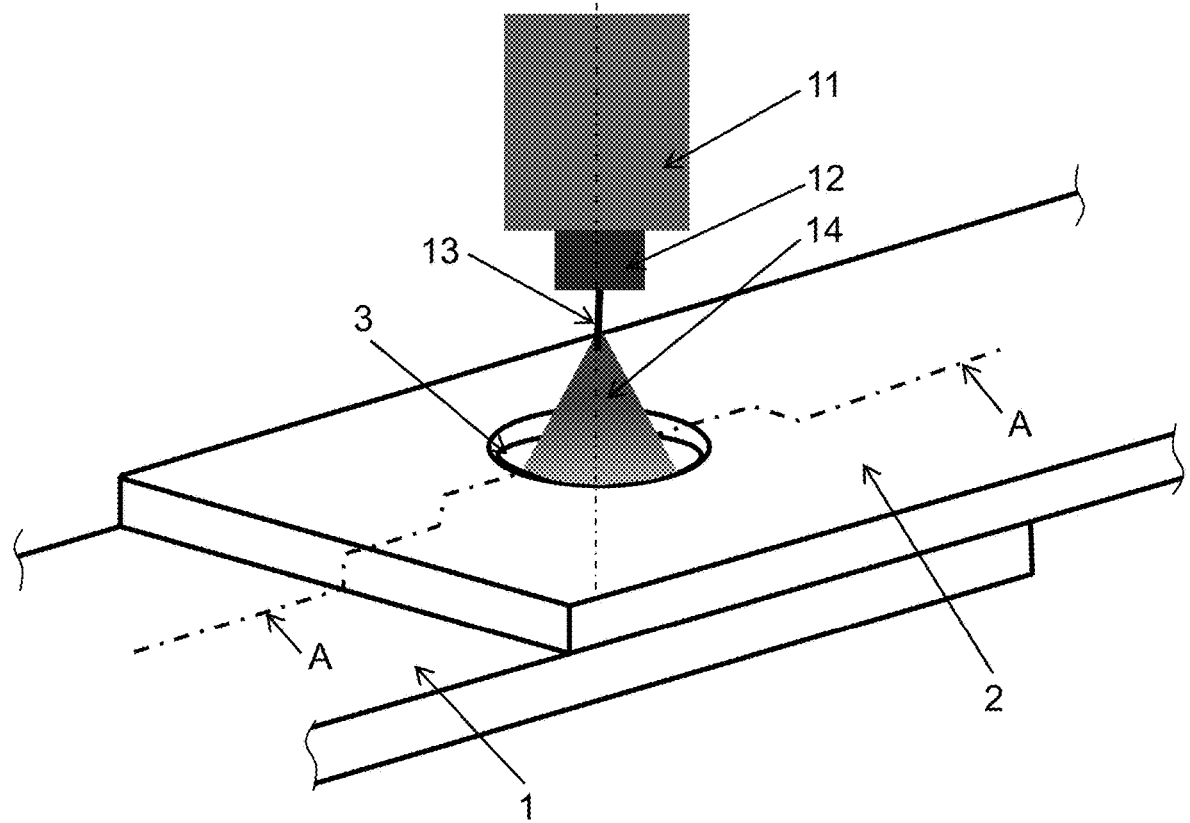
FIG. 11 is a diagram of a junction structure during arc welding according to the first and second exemplary embodiments of the present disclosure.
Figure 12:
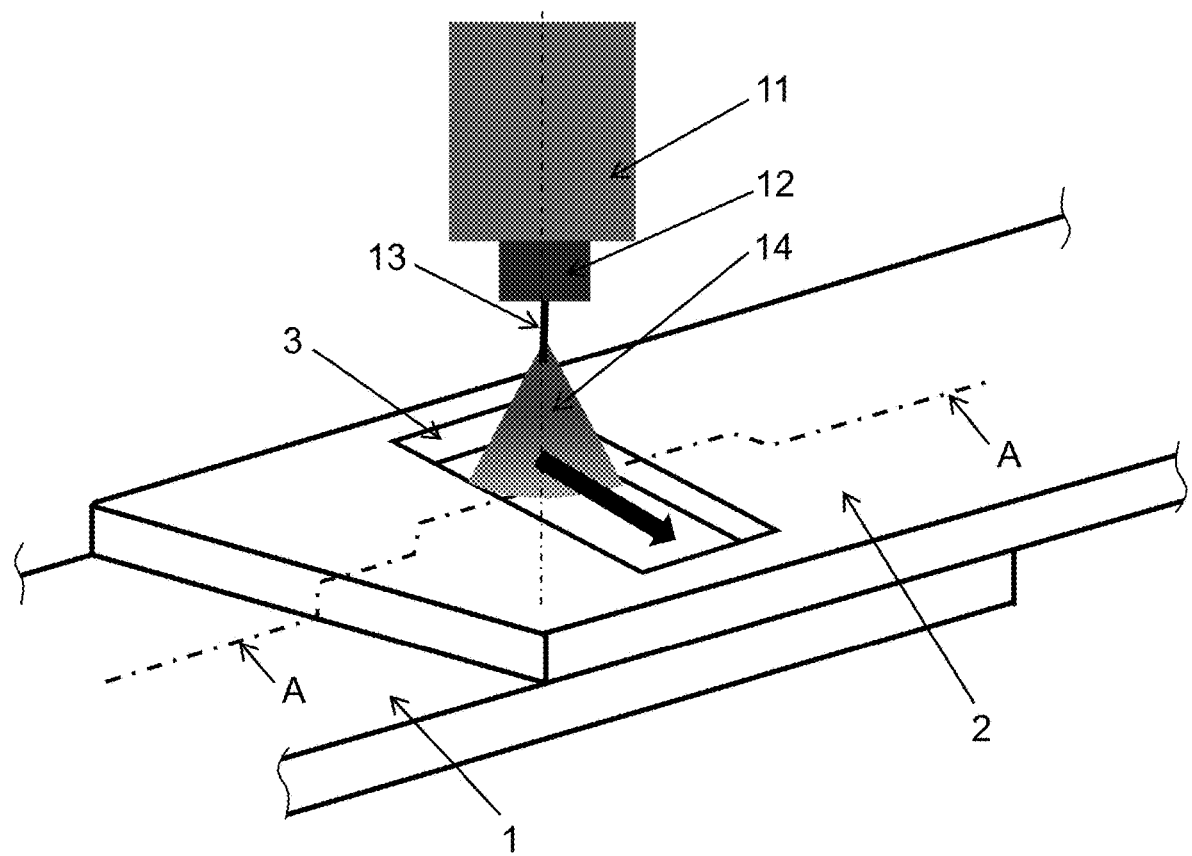
FIG. 12 is a diagram of another junction structure during arc welding according to the first and second exemplary embodiments of the present disclosure.
Figure 13:
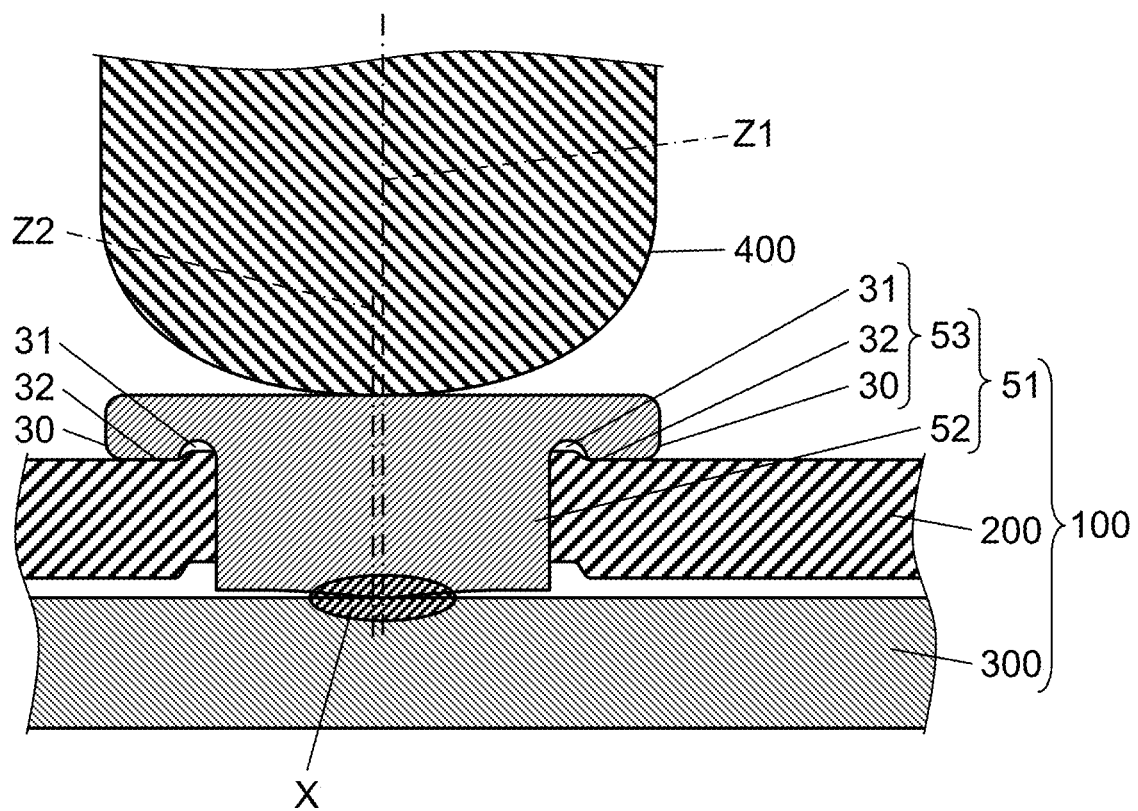
FIG. 13 is a schematic diagram of joining different types of materials together in a conventional manner.

The present exemplary embodiment will be described with reference to FIGS. 1 to 7. FIG. 1 shows a junction structure including the following junction members: first material 1, which is a metallic material; third material 13, which is a welding wire and is similar in type to first material 1 and weldable to first material 1; and second material 2, which is different in type from first material 1 and difficult to be welded to first material 1. Second material 2 as the upper plate of the junction structure has through part 3, which may be circular-shaped as shown in FIG. 11 or rectangular-shaped as shown in FIG. 12. FIG. 1 is a cross sectional view taken along lines A-A shown in FIGS. 11 and 12.

As shown in FIG. 1, third material 13 as the welding wire and first material 1 ("first metallic material" in Claims), which are similar in type to each other are joined together such that second material 2 different in type from first material 1 is fixedly stacked on first material 1. Next, third material 13 is melted by arc heat such that the molten metal is deposited into through part 3 of second material 2 along the thickness of first material 1. After filling through part 3, the molten metal of the welding wire overflows onto holding surface 22, which is on the upper surface of second material 2 and surrounds through part 3. This arc welding is performed by an arc welder including a welding torch (not shown). The torch is equipped, at its distal end, with nozzle 11 for supplying a shielding gas or the like to the weld zone of the workpiece, and tip 12 for guiding the wire to the weld zone while supplying welding current to the wire. Note that if no shielding gas is used, nozzle 11 is dispensable.

As described above, second material 2 with through part 3 is stacked on first material 1, and arc welding is performed on through part 3 along the thickness of first material 1 such that first material 1 and third material 13 are melted and joined together. The molten third material 13 is deposited into through part 3 of second material 2 and is then deposited onto holding surface 22, which is on the upper surface of second material 2 and surrounds through part 3. As a result, holding surface 22 is covered with flanged bead 21, so that first material 1 and second material 2 are bonded together.

Through part 3, which prevents misalignment between second material 2 and first material 1, allows visually checking the mark of an arc welding position and the appropriateness of the position of the bead.

Through part 3 of second material 2 is circular through-hole 4 in the present exemplary embodiment, but may alternatively be a through groove. Further alternatively, through part 3 may be oval- or oblong-shaped.

Figure 2:
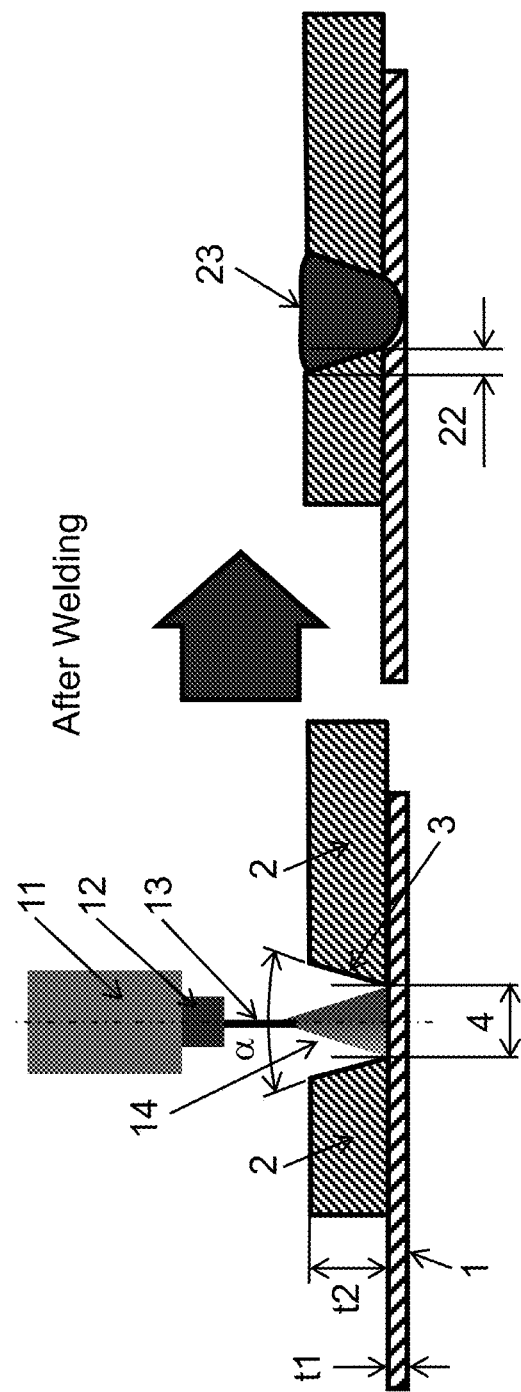
FIG. 2 is a schematic diagram of another junction structure during arc welding according to the first exemplary embodiment of the present disclosure.

The molten metal of third material 13 and/or first material 1 solidifies and shrinks on holding surface 22, allowing second material 2 and first material 1 to be firmly fixed together. Holding surface 22 has been defined to be on the upper surface of second material 2 and to surround through part 3 as shown in FIG. 1 in the present embodiment, but may alternatively be tapered along the inner wall of through part 3 as shown in FIG. 2. In this case, holding surface 22 is closely covered with tapered bead 23.

Tapered bead 23 allows the molten metal of third material 13 and/or first material 1 to solidify and shrink on holding surface 22, so that second material 2 and the first material can be fixed together without a flange part. This structure prevents bead 23 from projecting upward from the upper surface of second material 2. The structure also reduces welding time.

The metallic materials similar in type are defined as metallic materials weldable to each other. They can not only be the same materials, but also be materials readily weldable to each other, such as ferrous metals or nonferrous metals. To be more specific, materials 1 and 13 can be a combination of ferrous metals, for example, two types of mild steel; high-tensile steel and mild steel; and two types of stainless steel. Materials 1 and 13 can also be a combination of nonferrous metals, for example, two types of aluminum; aluminum and an aluminum alloy; and two types of aluminum alloys.

Second material 2 is defined as a material different from first material 1 and difficult to be welded to first material 1. For example, when first material 1 is a ferrous metal, second material 2 can be a nonferrous metal, such as copper or aluminum. Second material 2 can also be a non-metallic material, such as carbon fiber reinforced plastic (CFRP), polyethylene terephthalate (PET) or other resins.

As a reverse case, when first material 1 and third material 13 are nonferrous metals such as copper or aluminum, second material 2 can be a ferrous metal.

In arc welding shown in FIG. 1, an arc is generated between third material 13 as the welding wire and first material 1 within through part 3 of second material 2 along the thickness of first material. Consequently, the molten metal is formed into flanged bead 21 as shown in FIG. 1.

Next, bead formation during and after the welding process will now be described with reference to FIG. 1.

Arc 14 in spot welding is directed into through part 3 of second material 2 so as to form bead 21. During this welding process, third material 13 as the welding wire is melted, and the molten metal is solidified and shrunk while being formed into bead 21. Consequently, first material 1 and third material 13 sandwich and press second material 2.

As the heat input is higher, the molten metal of third material 13 solidifies and shrinks to a greater extent, and hence, compresses second material 2 to a greater extent.

Figure 6:
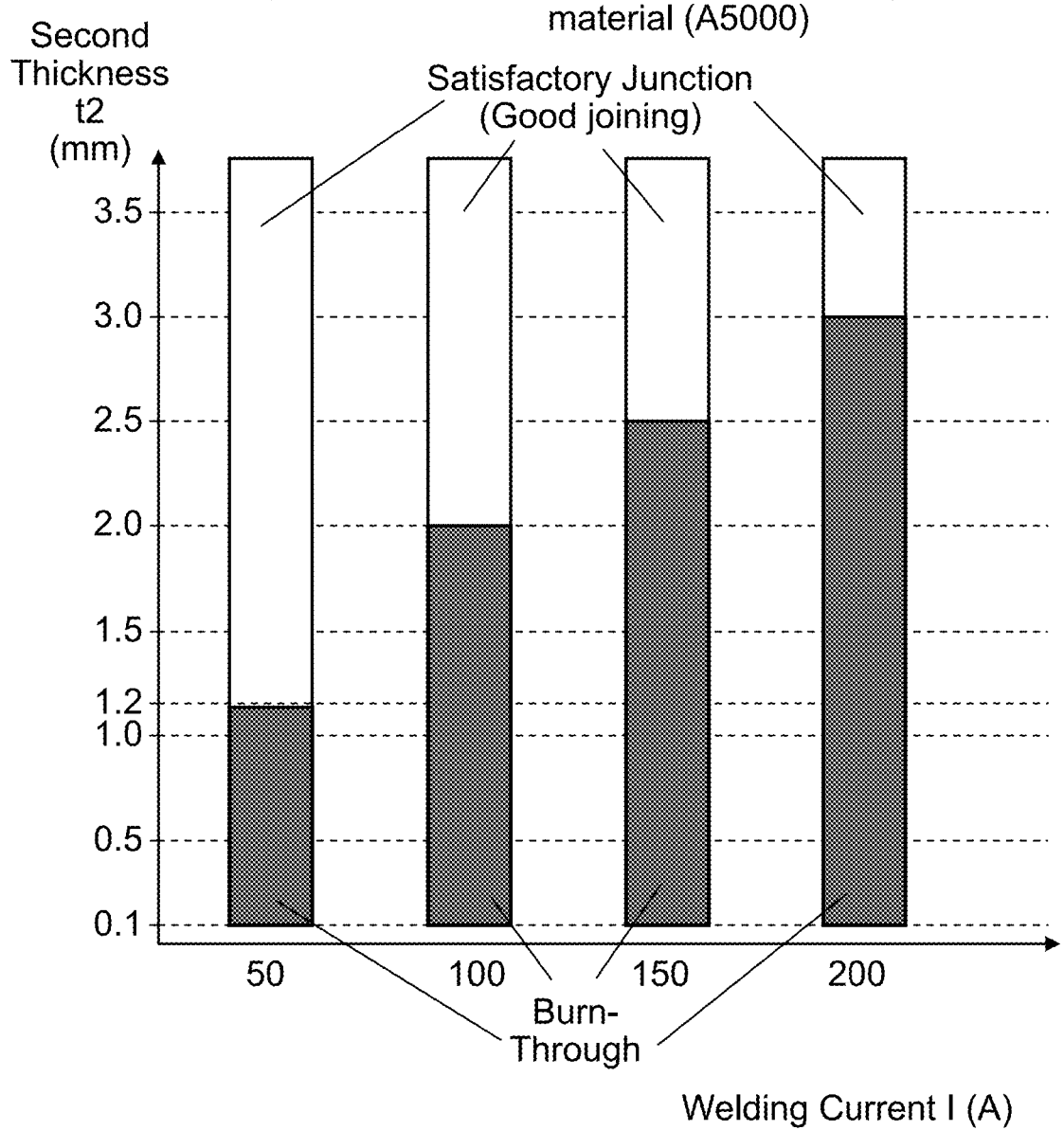
FIG. 6 is a graph showing the measurement results of the relationship between a welding current and the thickness t2 of a second material according to the first exemplary embodiment of the present disclosure.

When first material 1 and third material 13 are metallic, and second material 2 is aluminum, the welding condition is calculated from experimental data, and an example of the data is shown in FIG. 6.

FIG. 6 is a graph showing the measurement results of the relationship between the thickness t2 of second material 2 (the thickness of through part 3) and a welding current I. In this experiment, first material 1 and third material 13 are mild steel, whereas second material 2 is aluminum as a nonferrous metal. In this combination, second material 2 is stacked on the top of first material 1, and metal active gas (MAG) arc welding is performed on through part 3 along the thickness of first material 1.

To be more specific, in the example shown in the graph, spot welding is performed at a welding current I of 50 A to 200 A such that first material 1 and third material 13 are melted and bonded together to fix first material 1 and second material 2 together. For example, when through part 3 of second material 2 has through-hole 4 of φ10 mm, the area to be irradiated with arc 14 inside through-hole 4 of through part 3 along the thickness of first material 1 has a spot diameter of less than φ10 mm, which is small enough to fit in through-hole 4.

The welding time, which differs depending on the thickness of second material 2, is the time until a flanged or tapered bead is formed.

As shown in FIG. 6, assume that first material 1 is mild steel with a thickness t1 of 1.2 mm, and second material 2 is an A5000 series aluminum alloy. In this case, if through part 3 of second material 2 has a thickness t2 of not less than 1.2 mm, first material 1 has no burn-through at a welding current I of 50 A. Moreover, the molten metal of third material 13 as the welding wire is deposited into through part 3 so as to form flanged bead 21 and tapered bead 23. These beads 21 and 23 enable second material 2 to be sandwiched between first material 1 and third material 13.

In the same manner, second material 2 can be prevented from having burn-through so as to successfully form flanged bead 21 and tapered bead 23 when the thickness t2 of second material 2 is not less than 2.0 mm at a current I of 100 A;

when the thickness t2 is not less than 2.5 mm at a current I of 150 A; and when the thickness t2 is not less than 3.0 mm at a current I of 200 A.

In this junction structure, third material 13 is melted and bonded to first material 1 so as to fix first material 1 and second material 2 together. Therefore, as the thickness of the mild steel (first material 1) to be melted and bonded to the welding wire increases, the welding current increases. With the increased welding current, welding can be performed with less burn-through.

Thus, the welding wire solidifies and shrinks on first material 1, so that second material 2 is compressed between the first metallic material and flanged bead 21 or tapered bead 23 and is fixed to first material 1.

Second material 2 is more likely to have burn-through when it is thinner, and is less likely to when it is thicker. This is because when thin, second material 2 has a low heat capacity, causing welding heat to be trapped with no escape whereas when thick, the heat can easily escape.

When second material 2 has a lower melting point than first material 1, second material 2 is preferably thicker than first material 1. The reason for this is that if second material 2 is thinner than first material 1, second material 2 may have burn-through while third material 13 is being melted and joined to first material 1. Thus, second material 2 is preferably thicker than first material 1 so as to have a relatively high heat capacity.

The thickness ratio of first material 1 to second material 2 is preferably not less than 1:1, and is particularly preferably not less than 1:1.5 considering the tolerance.

Thus, second material 2 can be joined to first material 1 without burn-through.

If the spot diameter of the area to be irradiated with arc 14 is larger than the diameter of through-hole 4, for example, $\varphi$10 mm, second material 2 is melted more than necessary, causing third material 13 to be insufficiently fixed to first material 1 To avoid this happening, the arc spot diameter is preferably smaller than the diameter of through-hole 4 of second material 2.

Figure 3:
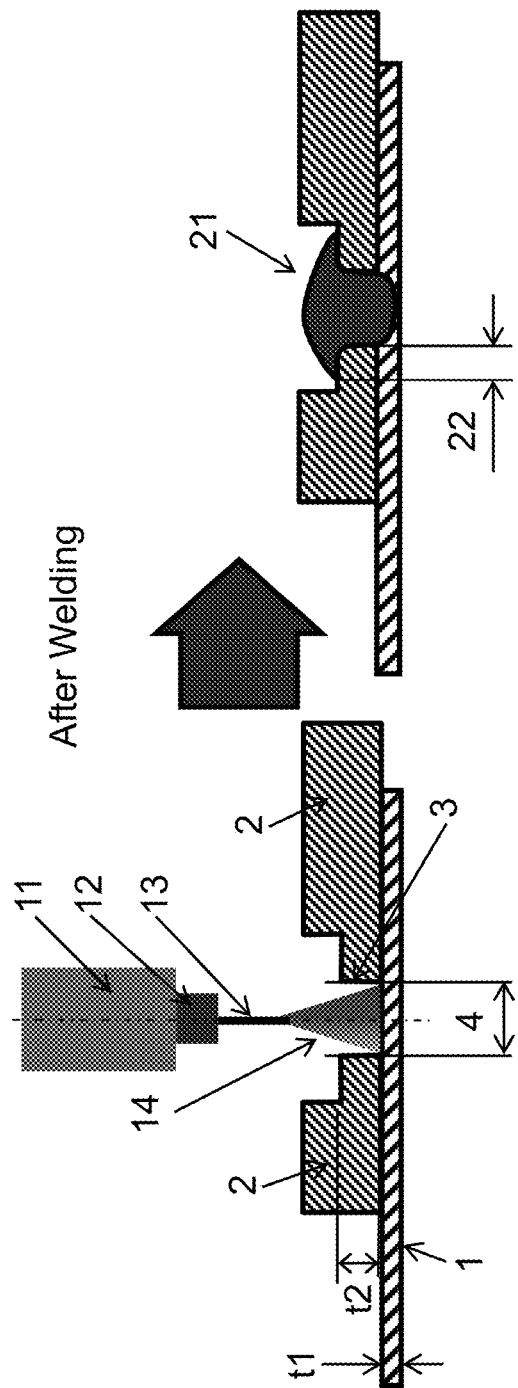
FIG. 3 is a schematic diagram of still another junction structure during arc welding according to the first exemplary embodiment of the present disclosure.
Figure 4:
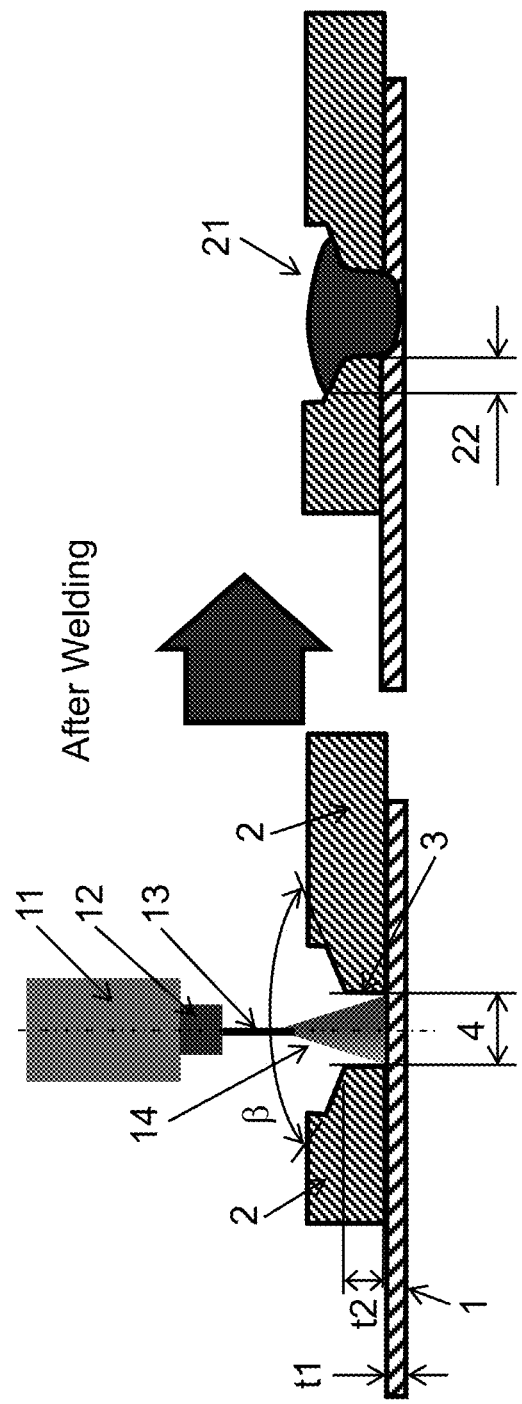
FIG. 4 is a schematic diagram of still another junction structure during arc welding according to the first exemplary embodiment of the present disclosure.
Figure 5:
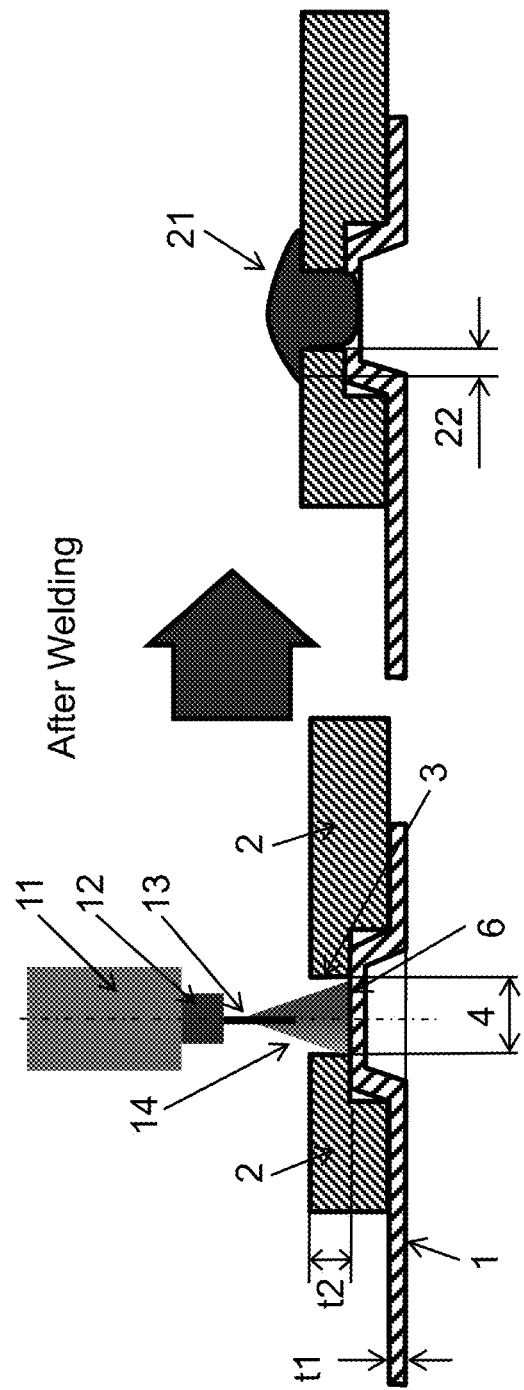
FIG. 5 is a schematic diagram of still another junction structure during arc welding according to the first exemplary embodiment of the present disclosure.

Other junction structures shown in FIGS. 3 to 5 can be obtained by the same welding process as the junction structure shown in FIG. 1.

FIG. 3 shows a junction structure including first material 1 and second material 2 having a recess with through part 3. Second material 2 is stacked on first material 1 with the recess facing up, and first material 1 and second material 2 are fixed to each other. The recess in the upper surface of second material 2 is larger in size than the through-hole 4 in the bottom surface of second material 2. The recess may have the same shape as through-hole 4 (e.g., circular-shaped). Alternatively, they have different shapes; for example, through-hole 4 may be circular-shaped and the recess may be groove-shaped.

FIG. 4 differs from FIG. 3 in that the inner surface of the recess (the portion of through-hole 4 of second material 2 that is above the portion with the thickness t2) is tapered.

The junction structure shown in FIG. 4 allows, without having a flange-shaped part, solidifying and shrinking the molten metal of third material 13 and/or first material 1 onto holding surface 22 so as to firmly fix first material 1 and second material 2 together. This reduces the following: the thickness of the flange part; the height of bead 21 projecting from the upper surface of second material 2; and the welding time.

FIG. 5 shows another junction structure. First material 1 has protruding junction 6, whereas through part 3 of second material 2 has a recess larger than protruding junction 6. Second material 2 is stacked on first material 1 such that the recess in through part 3 faces down and is engaged with protruding junction 6. Engaging the recess and the protrusion with each other facilitates the positioning of first material 1 and second material 2. The arc is directed into through part 3 aligned with the middle part of the upper surface of protruding junction 6 of first material 1, so that the welding wire and/or first material 1 is formed into flanged bead 21 or tapered bead 23, allowing first material 1 and second material 2 to be melted and joined together.

Thus, the molten welding wire is solidified and shrunk on first material 1 to generate a compressive force to second material 2, thereby fixing first material 1 and second material 2 together.

When protruding junction 6 of first material 1 is formed by embossing, the asperities caused by full penetration into the rear surface of junction 6 of first material 1 during arc welding can be absorbed to the rear surface of first material 1. The protruding junction 6 with a stepped profile can reduce the thickness of second material 2 at the junction. This reduces the welding time and the heat effect on second material 2 during welding. At the protruding portion of first material 1, when the top surface is embossed, the bottom surface is recessed upward; alternatively, however, the protruding portion may be formed by partially thickening first material 1.

In the junction structure shown in FIG. 5, the upper surface of second material 2 is flat, but may alternatively have a recess contiguous to through part 3 as shown in FIGS. 3 and 4. This structure has both the advantages of the junction structure shown in FIG. 5 and the advantages of the junction structures shown in FIGS. 3 and 4.

The middle part of the protruding junction 6 is not limited to the exact center of both ends of the protrusion, but is widely interpreted as any position between both ends of the protrusion.

In FIGS. 1 to 5, assume that the melting point of second material 2 is lower than the temperature of the molten metal of first material 1 and third material 13 during arc welding. In this case, the molten welding wire is deposited in such a manner as to cover holding surface 22, which is either on the upper surface of second material 2 or on the inner wall of through part 3. As a result, the direct heat input melts holding surface 22 of second material 2, so that third material 13 and holding surface 22 of second material 2 can be firmly fixed.

However, a combination of mild steel and a nonferrous metal such as aluminum can generate an intermetallic compound when melted and mixed together, causing the contact surface to be extremely fragile.

The junction strength between material 1 and material 2 is not ensured only by the contact surface between third material 13 and holding surface 22 of second material 2 alone. The junction strength is fully ensured by flanged bead 21 or tapered bead 23.

When second material 2 is resin, its melting point is much lower than those of third material 13 and first material 1. Consequently, third material 13 can intrude into the molten part of the resin, and when solidified after welding, can provide an anchor effect to increase the junction strength.

Figure 7:
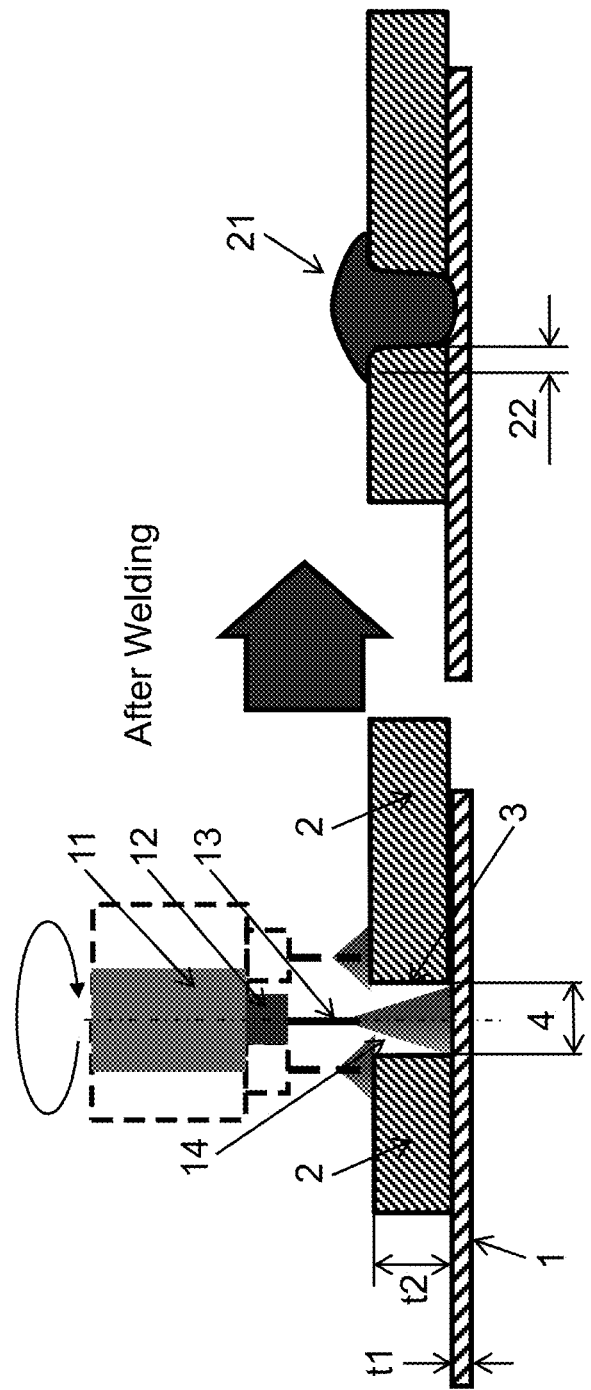
FIG. 7 is a schematic diagram of still another junction structure during arc welding according to the first exemplary embodiment of the present disclosure.

When second material 2 has particular properties, arc welding can be performed on holding surface 22 of second material 2 to form a spiral welding trajectory during alternating-current welding or short-circuit welding. As a result, flanged bead 21 can be formed with a low heat input as shown in FIG. 7.

As described above, according to the junction structure obtained by arc welding with arc 14 in the present exemplary embodiment, when first material 1 similar in type to third material 13 as the welding wire is joined with second material 2 different in type from first material 1, second material 2 difficult to be welded to first material 1 is stacked on first material 1. Second material 2, which is at least one type of different material (different from first material 1) and is difficult to be welded to first material 1, is stacked on first material 1. Second material 2 has through part 3 through first material 1. Third material 13 is welded on first material 1 by depositing the molten metal of third material 13 into through part 3 of second material 2 along the thickness of first material 1, so that first material 1 and third material 13 are joined together. As a result, second material 2 and first material 1 different in type from each other are fixed via flanged bead 21 or tapered bead 23.

This allows a welding machine as one system to perform the following steps: a step of welding similar types of metallic materials together, and a step of welding a metallic material and a different material different from the metallic material together. Thus, first material 1 and third material 13 are melted and bonded together, and when the molten metal of first material 1 and/or third material 13 is solidified and shrunk, second material 2 is compressed and fixed to materials 1 and 13.

This structure achieves highly reliable junction between materials different in type and difficult to be welded to each other. This structure can not only greatly reduce production cycle time but also can increase stiffness at required positions, thereby increasing the degree of design freedom of junction members.

The arc welding in this embodiment has been described as arc welding with a consumable electrode, but may alternatively be tungsten inert gas welding or plasma welding (not shown) both with a non-consumable electrode.

Second Exemplary Embodiment

Figure 8:
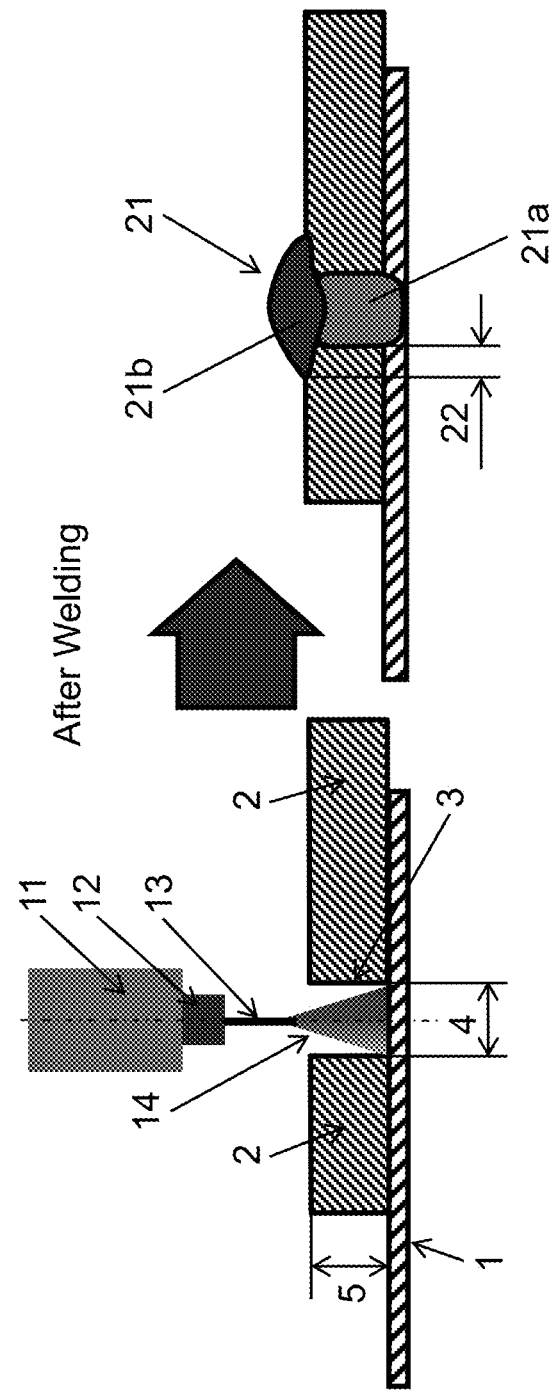
FIG. 8 is a schematic diagram of a junction structure during arc welding according to a second exemplary embodiment of the present disclosure.
Figure 9:
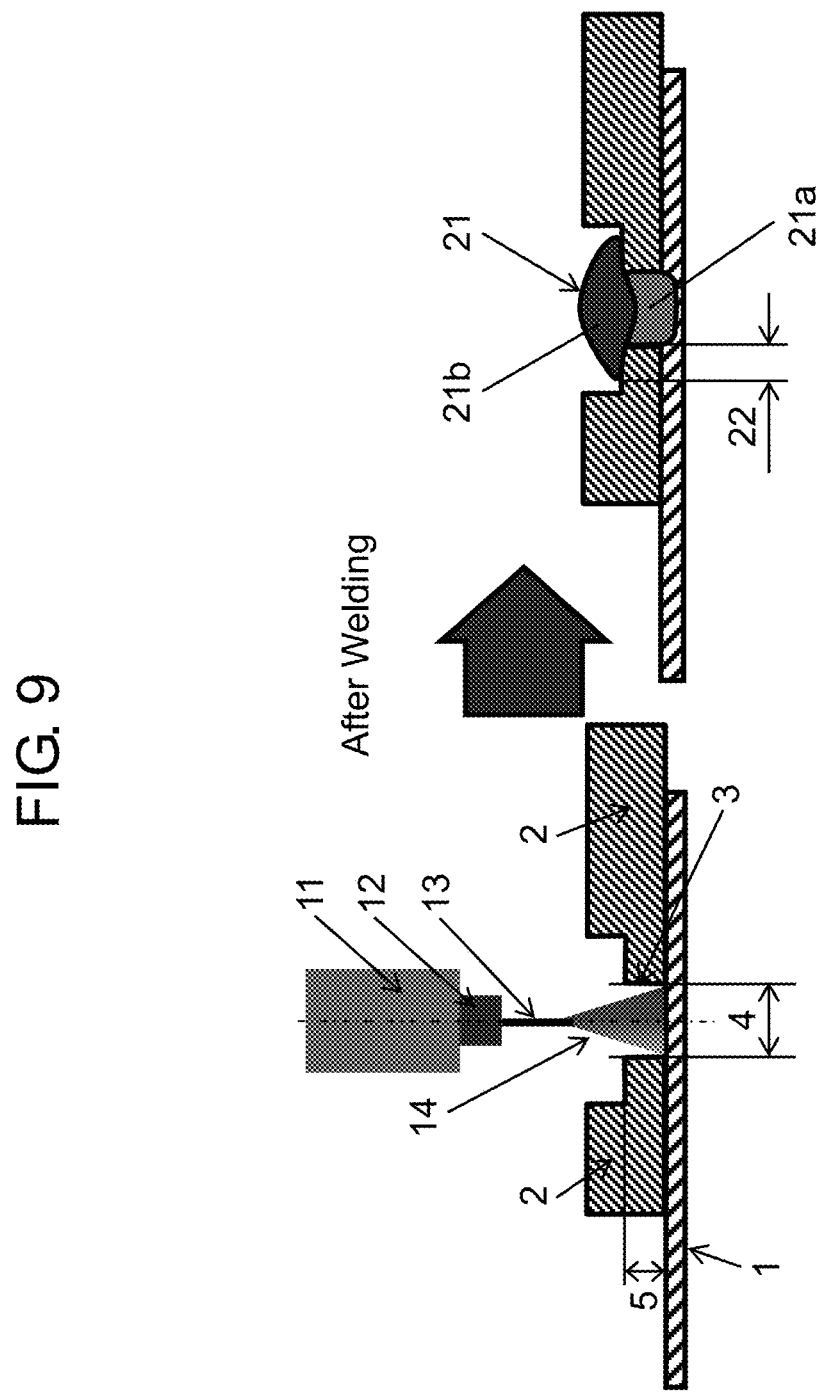
FIG. 9 is a schematic diagram of another junction structure during arc welding according to the second exemplary embodiment of the present disclosure.
Figure 10:
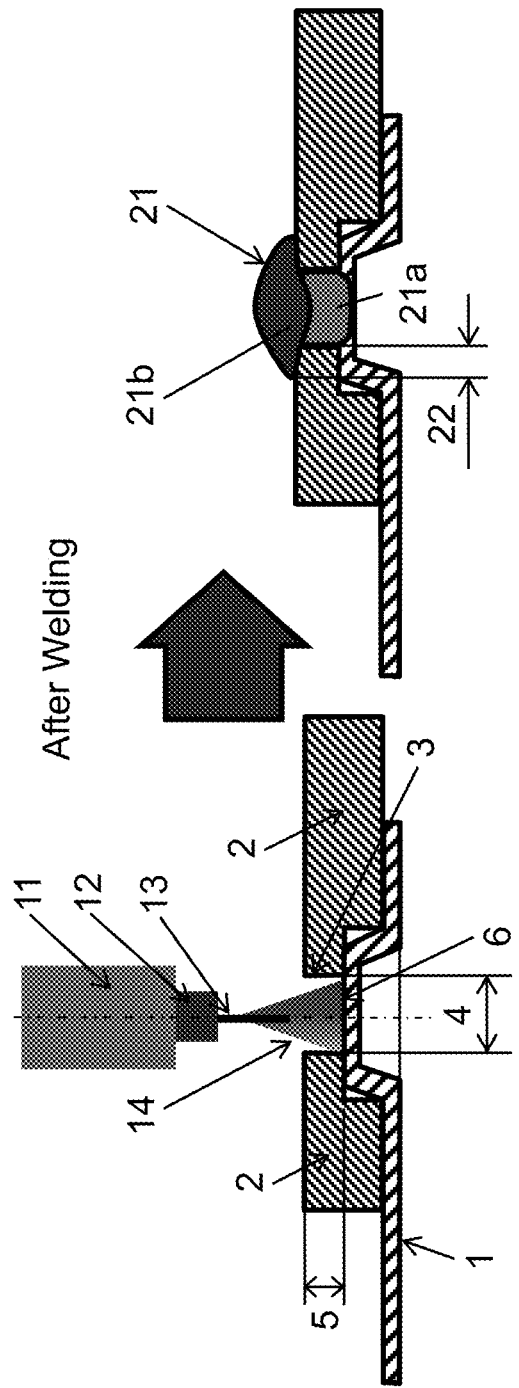
FIG. 10 is a schematic diagram of still another junction structure during arc welding according to the second exemplary embodiment of the present disclosure.

A second exemplary embodiment will now be described with reference to FIGS. 8 to 10. The same configuration as in the first exemplary embodiment will not be described in this embodiment.

The second exemplary embodiment differs from the first exemplary embodiment in that the junction structures with beads 21 and 23 shown in FIGS. 1 to 5 are obtained by dividing the welding process into a plurality of steps each having a different welding method and a different welding condition. The plurality of steps include a first step of depositing molten third material 13 into through part 3 of second material 2 and a second step of depositing molten third material 13 onto holding surface 22 of second material 2. Having the plurality of steps enables each step to have a different welding method and a different welding condition according to the characteristics of second material 2.

For example, in the first step of depositing molten third material 13 into through part 3 of second material 2, bead 21a is formed by performing short-circuit welding in which a short-circuit state and an arc state are alternately repeated to reduce the heat input. The first step is followed by the second step of depositing molten third material 13 onto holding surface 22 of second material 2. In the second step, bead 21 containing flange-shaped bead 21b can be obtained by performing pulse welding with a low heat input and a relatively wide arc suitable for forming a flange.

On the other hand, when first material 1 is thick, the heat input should be large enough for penetration. However, if welding is performed in a single step with a current high enough for penetration, second material 2 may be melted. This concern, however, can be eliminated by dividing the welding process into the plurality of steps. The first step employs welding with a heat input high enough for penetration (e.g., short-circuit welding with a heat input high enough for penetration and with a narrow arc). The subsequent second step, which is performed in a welding condition different from that in the first step, employs welding with a heat input low enough to prevent second material 2 from being melted (e.g., positive polarity pulse welding with a low heat input and a wide arc, or AC pulse welding).

This achieves flanged bead 21 or tapered bead 23 on second material 2 with a reduced the heat input.

When the welding process is divided into the plurality of steps as described above, and second material 2 has particular properties, the second step can be positive polarity arc welding with a low heat input, or spiral arc welding such as AC welding or short-circuit welding on holding surface 22 of second material 2. This results in forming flanged bead 21 or tapered bead 23 in the same manner as FIG. 7 of the first exemplary embodiment.

Although not illustrated, in the same manner as in FIG. 4 of the first exemplary embodiment, when the recess of through-hole 4 of second material 2 that is above the portion with the thickness t2 is tapered, flanged bead 21 or tapered bead 23 can be formed in the tapered portion of second material 2 with a low heat input. This makes the welding wire less susceptible to the viscosity of the droplet when the wire is melted. As a result, a flanged or tapered bead is formed along the preformed tapered portion of second material 2 at the middle part of through part 3. This enables second material 2 to be compressed and fixed more reliably between third material 13 and first material 1.

The second step may be performed by the same welding method as the first step and under welding conditions (e.g., current and other parameters) different from those in the first step.

The two steps in the welding process may be switched from one to the other while the arc is maintained during arc welding. Alternatively, the arc may be turned off and then turned on again.

Furthermore, the welding process may have three or four steps.

The present disclosure has overcome the conventional problems. As described in the above embodiments, the junction structure of the present disclosure eliminates the need to use complicated parts that are fabricated by high precision processing technology. As another advantage, the use of arc welding instead of resistance spot welding reduces the operating time including welding time to about 25% of resistance spot welding, thereby greatly improving the throughput. Still another advantage is the increase in the stiffness at required positions and the degree of design freedom of junction members.

INDUSTRIAL APPLICABILITY

The junction structure of the present disclosure is simple and can greatly reduce the production cycle time and increase stiffness at required positions when different types of materials are joined together. This junction structure, which can increase the degree of design freedom of junction members, is industrially applicable.

REFERENCE MARKS IN THE DRAWINGS 1 first material
2 second material 3 through part
4 through-hole
t1, t2 thickness
6 junction
11 nozzle
12 tip
13 third material
14 arc
21, 21a, 21b, 23 bead
holding surface 22

The invention claimed is:

1. A junction structure comprising:
a first metallic material;
at least one type of different material having a through part, the different material being different in type from the first metallic material, being difficult to be welded to the first metallic material, and being stacked on the first metallic material; and
a molten welding wire comprising a metallic material similar to the first metallic material, the molten welding wire being bonded to the first metallic material by arc welding through the through part along thickness of the first metallic material, the molten welding wire being deposited into the through part of the different material, and the molten welding wire being deposited, to form a flange portion, onto a region which is on an upper surface of the different material and surrounds the through part,
wherein
the different material and the first metallic material are fixed together by a compressive force between the flange portion and the first metallic material, the compressive force being generated when the molten welding wire is solidified and shrunk onto the first metallic material, and
when the different material has a lower melting point than the first metallic material, the different material has a larger thickness than the first metallic material, and
wherein
the different material has a recess containing the through part to be joined to the first metallic material, and
the recess comprises a first tubular shape and the through part comprises a second tubular shape, the first tubular shape and the second tubular shape being different.

2. The junction structure according to claim 1, wherein the different material is stacked on the first metallic material with the recess facing up and is fixed to the first metallic material such that the flange portion is entirely in the recess.

3. The junction structure according to claim 1, wherein the first metallic material has a protruding junction,
the different material has the recess larger than the protruding junction of the first metallic material,
the protruding junction of the first metallic material is in the recess of the different material,
the through part is smaller in diameter than a top of the protruding junction, and
the molten welding wire is fixedly joined to a middle part of an upper surface of the protruding junction of the first metallic material through the through part of the different material.

4. A junction structure comprising:
a first metallic material;
at least one type of different material having a through part, the different material being different in type from the first metallic material, being difficult to be welded to the first metallic material, and being stacked on the first metallic material; and
a molten welding wire bonded to the first metallic material by arc welding through the through part along thickness of the first metallic material, the molten welding wire being deposited into the through part of the different material, and the molten welding wire being deposited onto a region which is on an upper surface of the different material and surrounds the through part,
wherein the different material and the first metallic material are fixed together by a welding process including a plurality of steps each having a different welding method or a different welding condition such that the molten welding wire is fixed to the region surrounding the through part,
wherein
the different material has a recess containing the through part to be joined to the first metallic material, and
the recess comprises a first tubular shape and the through part comprises a second tubular shape, the first tubular shape and the second tubular shape being different.

5. The junction structure according to claim 4, wherein the plurality of steps comprises:
a first step of depositing the molten welding wire into the through part of the different material by short-circuit welding in which a short-circuit state and an arc state are alternately repeated; and
a second step of depositing the molten welding wire onto the region which is on the upper surface of the different material and surrounds the through part either by pulse welding with a wider arc than in the short-circuit welding performed in the first step or by short-circuit welding forming a spiral welding trajectory.

6. The junction structure according to claim 4, wherein switching between a first step of depositing the molten welding wire into the through part of the different material and a second step of depositing the molten welding wire onto a region which is on an upper surface of the different material and surrounds the through part can be performed either by:
while an arc is maintained, or
after the arc is turned off and then turned on again.

7. The junction structure according to claim 1, wherein when the different material is resin, arc welding is performed on the region on the upper surface of the different material either by alternating-current welding with a low heat input or by short-circuit welding forming a spiral welding trajectory, and
the molten welding wire weldable to the first metallic material is deposited onto the region on the upper surface of the different material during arc welding, so that a direct heat input can melt the region on the upper surface of the different material, allowing the molten welding wire to intrude into and to be firmly fixed on the region on the upper surface of the different material so as to engage each other.

8. The junction structure according to claim 1, wherein the arc welding is one of following:
arc welding with a consumable electrode,
tungsten inert gas welding with a non-consumable electrode, and
plasma welding with a non-consumable electrode.

9. A junction structure comprising:
a first metallic material;
at least one type of different material having a tapered through part, the different material being different in type from the first metallic material, being difficult to be welded to the first metallic material, and being stacked on the first metallic material; and
a molten welding wire bonded to the first metallic material by arc welding through the through part along thickness of the first metallic material, and the molten welding wire being deposited into the through part of the different material so as to form a flanged or tapered bead, so that the different material and the first metallic material are fixed together,
wherein
the different material has a recess containing the through part to be joined to the first metallic material, and
the recess comprises a first tubular shape and the through part comprises a second tubular shape, the first tubular shape and the second tubular shape being different.

10. The junction structure according to claim 1, wherein the first tubular shape is larger in size than the second tubular shape.

11. The junction structure according to claim 4, wherein the first tubular shape is larger in size than the second tubular shape.

12. The junction structure according to claim 9, wherein the first tubular shape is larger in size than the second tubular shape.

\* \* \* \* \*